Patented Jan. 16, 1923.

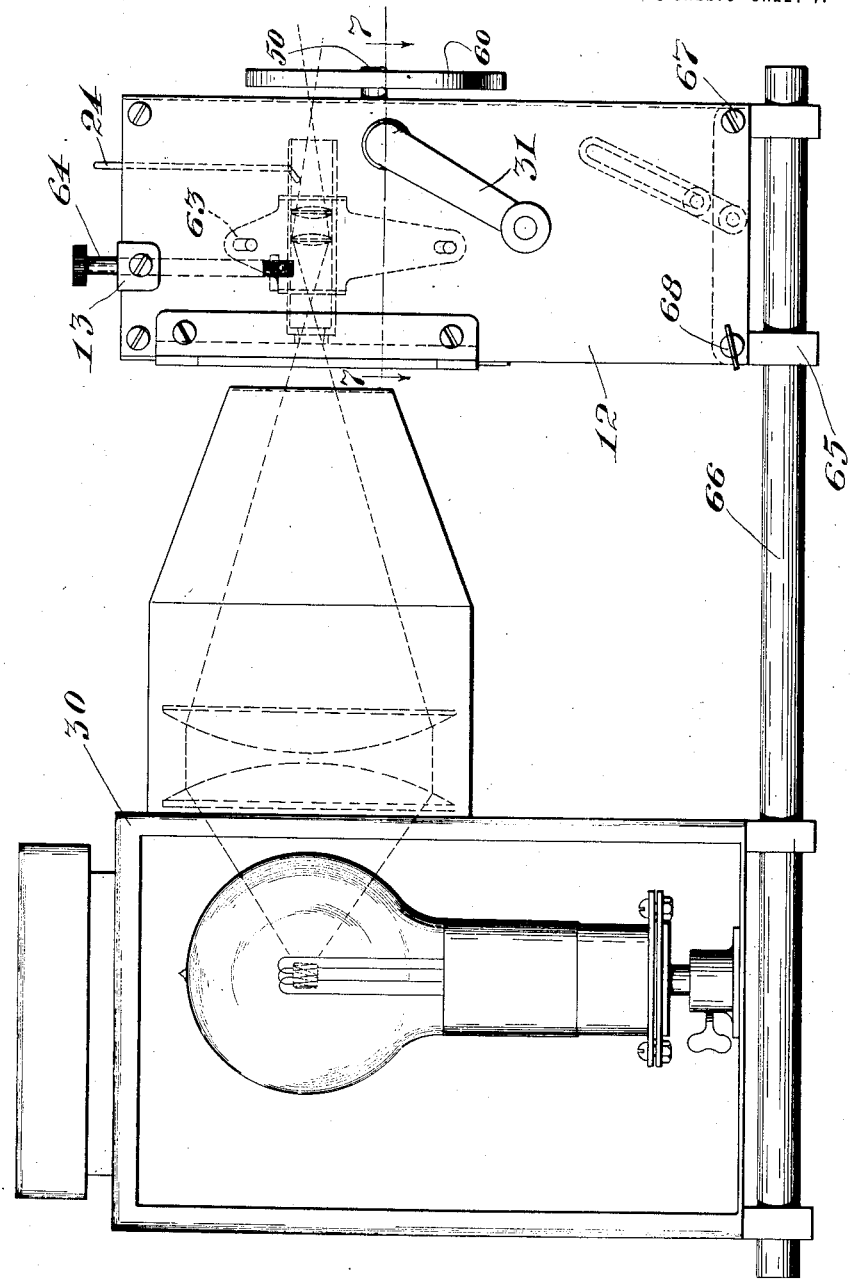

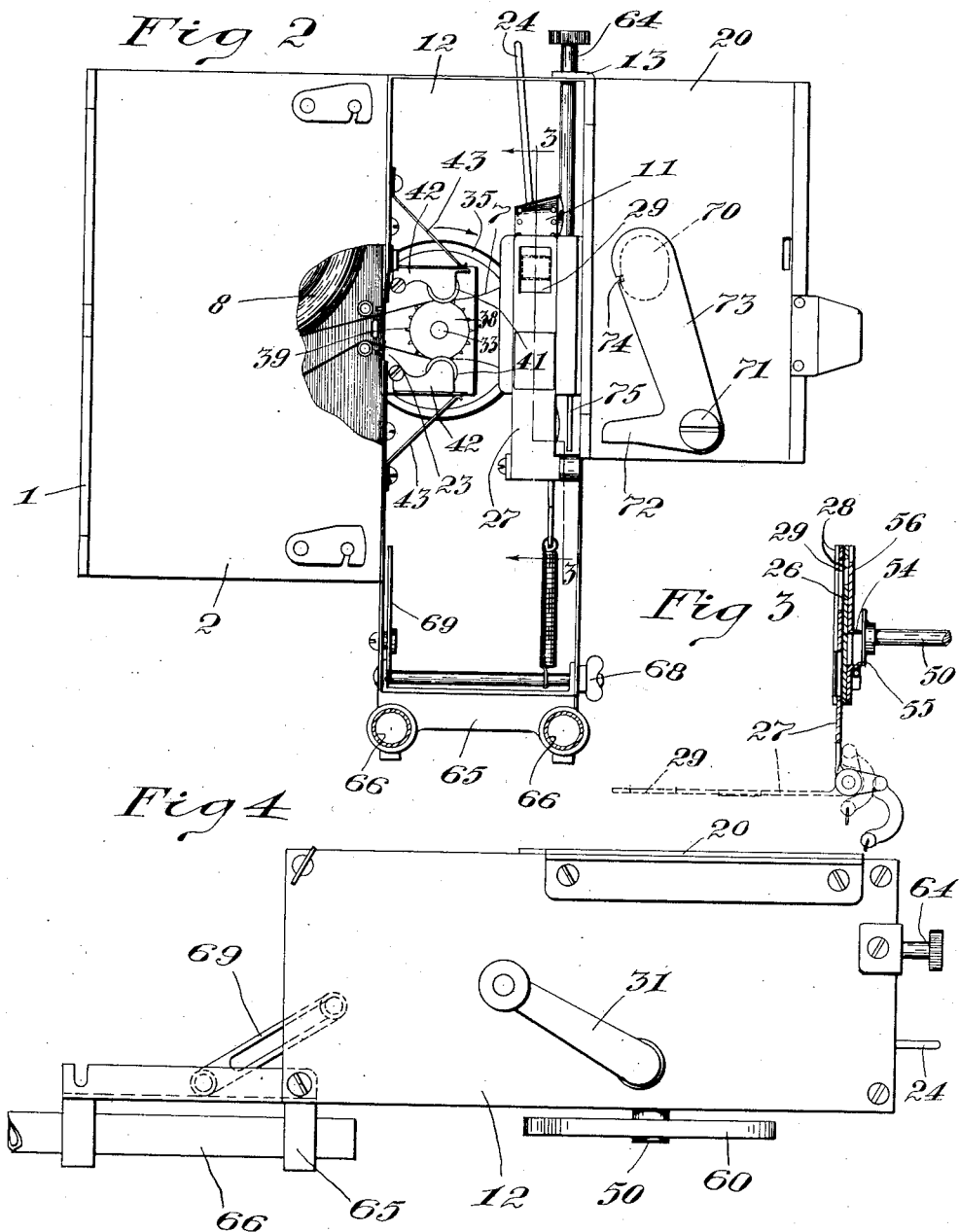

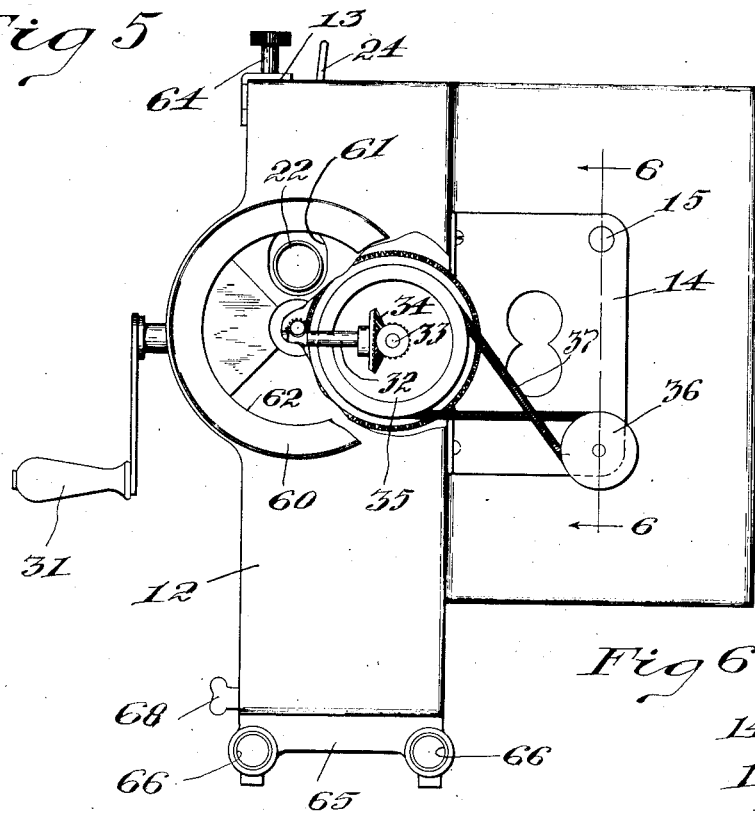
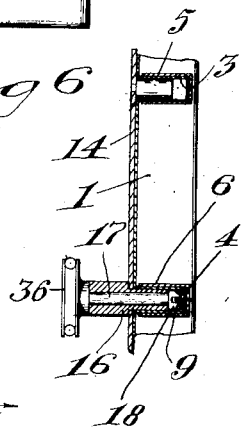
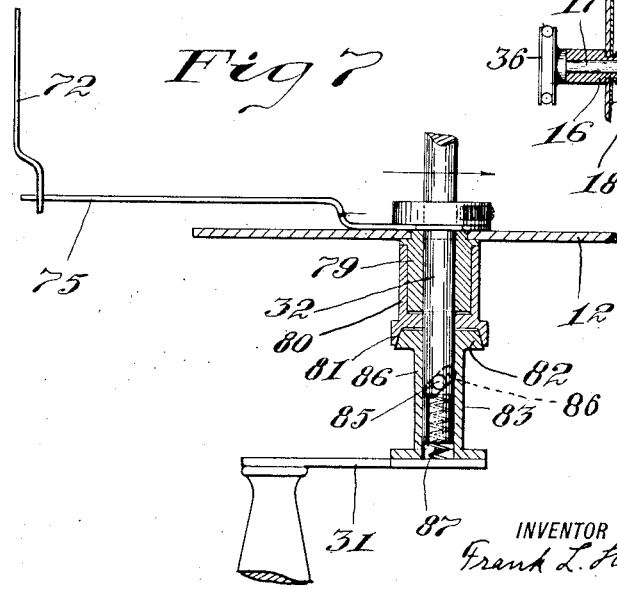

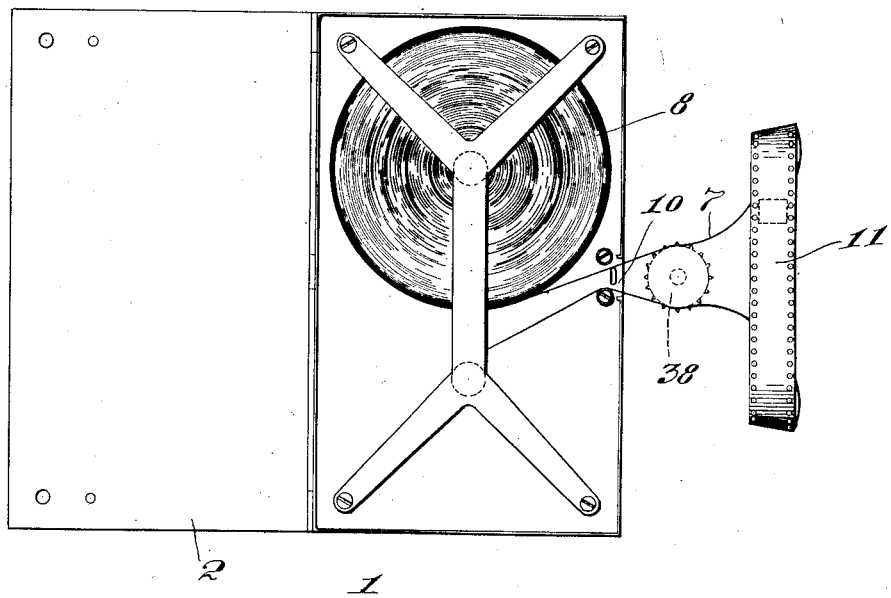
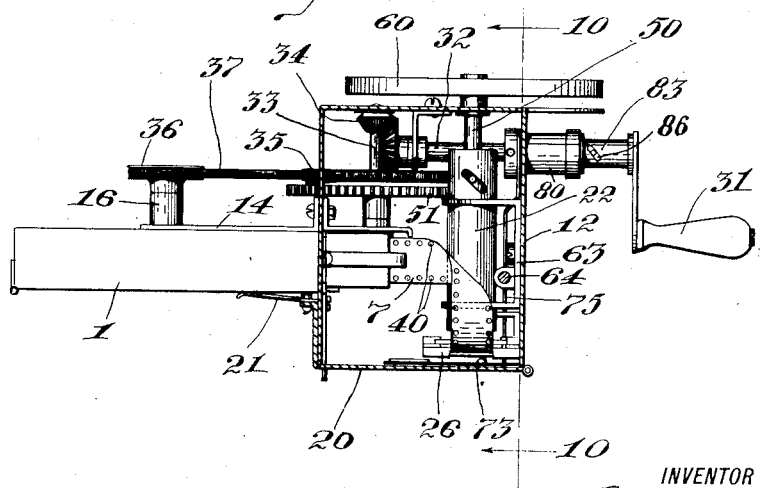

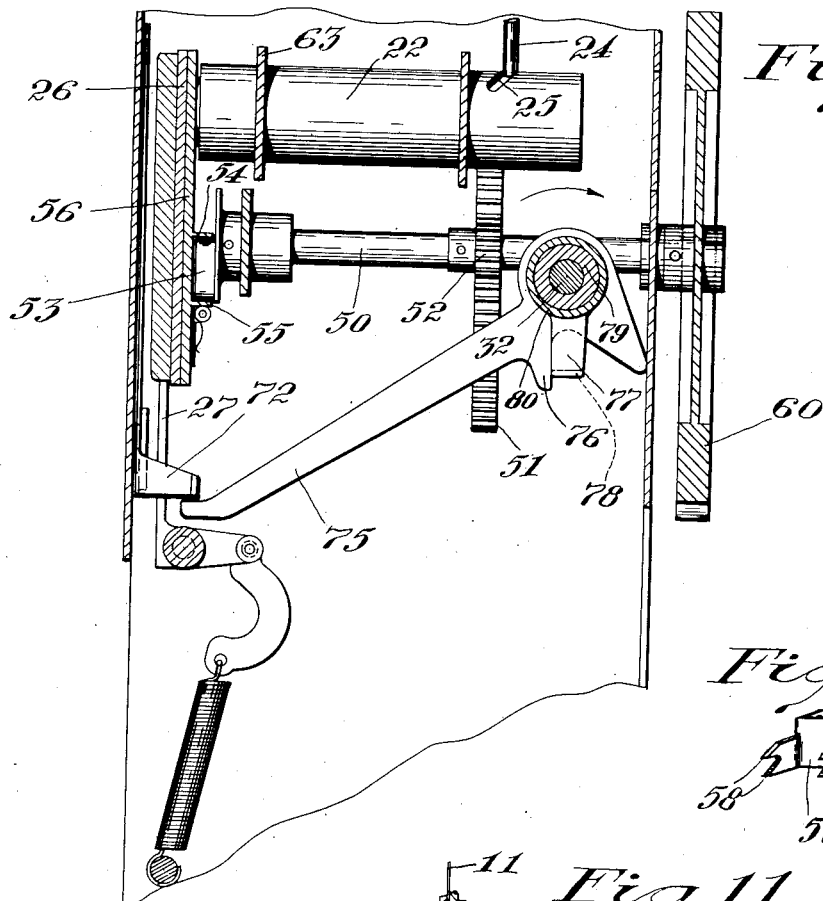

1,442,068

UNITED STATES PATENT OFFICE.

FRANK L. HOUGH, OF CHICAGO, ILLINOIS.

MOTION-PICTURE-PROJECTING APPARATUS.

Application filed June 19, 1916, Serial No. 104,484. Renewed August 25, 1922. Serial No. 584,236.

*To all whom it may concern:*

Be it known that I, FRANK L. HOUGH, a citizen of the United States, residing at Chicago, county of Cook, State of Illinois, have invented a certain new and useful Improvement in Motion-Picture-Projecting Apparatus, and declare the following to be a full, clear, and exact description of the same, such as will enable others skilled in the art to which it pertains to make and use the same, reference being had to the accompanying drawings, which form a part of this specification.

The present invention relates to the art of motion pictures and has for its object to simplify motion picture apparatus and devices.

Viewed in one of its aspects the present invention may be said to have for its object to produce a novel method of handling the film in a motion picture apparatus, whether it be the camera or the projector, so as to make it possible to house a complete sensitized film in a single cartridge which serves also as a container for receiving the film as it is exposed and to employ in the projecting apparatus a single magazine for each roll of film, the magazine serving also as a container for the film while out of the projecting apparatus.

Viewed in another of its aspects the present invention may be said to have for its object to produce a simple projecting apparatus including as a part thereof a simple magazine in which the film is stored when not in use and which may be quickly and easily attached and detached.

Viewed in a further aspect, my invention may be said to have for its object to produce a simple and compact projecting apparatus for motion pictures.

Viewed in another of its aspects, my invention may be said to have for its object to produce a simple and novel expedient for protecting the film against the heat of the lamp when the film is not running.

Viewed in a further aspect, my invention may be said to have for its object to produce a simple and novel shuttle device for feeding a motion picture film step by step.

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a side elevation of a complete projecting apparatus, including the lamp house, arranged in accordance with my invention;

Fig. 2 is a rear view of the projector with the door open and a portion of the magazine broken away;

Fig. 3 is a section taken approximately on line 3—3 of Fig. 2;

Fig. 4 is a side view of the projector similar to that of Fig. 1, but showing the projector swung into a position for convenient loading or unloading;

Fig. 5 is a front view of the projector, with a part of the fly wheel and shutter and parts of the casing broken away;

Fig. 6 is a section approximately on line 6—6 of Fig. 5;

Fig. 7 is a section on an enlarged scale taken approximately on line 7—7 of Fig. 1 illustrating only those parts relating to the fire shutter;

Fig. 8 is a rear view of the magazine with its door open and the film drawn out into the loop into which it is progressively formed as it passes through the machine;

Fig. 9 is a top plan view of the projector with the casing shown in section;

Fig. 10 is a section on an enlarged scale taken approximately on line 10—10 of Fig. 9;

Fig. 11 is a section on an enlarged scale taken approximately on line 3—3 of Fig. 2, but illustrating only a fragment of the apparatus;

Fig. 12 is an end view of the shuttle-actuating cam with the engaging flanges of the shuttle shown in dotted lines; and Fig. 13 is a perspective view of the pawl device forming part of the shuttle.

The apparatus illustrated is designed to be employed with a detachable film magazine comprising a container adapted to house a roll of film and a winding member upon which the film is adapted to be wound; the container serving as a storage receptacle for the film when not in use. The container is so constructed that the film is threaded through the wall thereof, in passing from the roll to the winding member, and may be drawn into a loop on the exterior of the container for insertion in the feeding and projecting mechanism.

The magazine is perhaps best illustrated in Figs. 6 and 8. Referring to these figures, 1 represents a shallow box, preferably a rectangular box made of sheet metal and having one of its wide sides made in the form of a door, 2. In the box are two separated supports, one adapted to hold a roll of film and the other constituting a winding member; these supports being preferably in the form of short posts projecting from the bottom of the box which forms the front wall of the magazine. In the arrangement shown, both posts, 3 and 4, are in the form of tubes registering with openings in the supporting wall of the container, or they may be tubular members held in place by being fitted into openings in said wall. Loose on each post is a thimble, these being indicated at 5 and 6 respectively. A film, 7, meaning by this what is usually called a single film or any number of single films connected together, is wound in a roll, 8, upon the thimble 5, while the free end is attached in any suitable way to the thimble, 6. The thimble 6 is provided with a web or fin, 9, projecting from the member forming the bottom of the thimble into the interior of the tubular post, 4, for the purpose of being engaged by a suitable winding jaw in the projector. Passing from the roll to the winding support the film is carried to the exterior of the container, conveniently through an opening or openings, 10, in one of the side walls of the container. The developed film may be supplied to the user either with the free end threaded through the wall of the container or in such condition that the user will be required to do the threading. At any rate, when the magazine is placed in a camera, the exposed portion of the film is grasped and the film is drawn out into a loop which is then turned inside-out; which brings a portion, 11, of considerable length into a plane at right angles to the ends of the loop,—that is, in a plane at right angles to the axes of the supporting posts. This permits the magazine to be attached at one side of a projecting apparatus having its optical axis parallel with the supporting posts of the magazine and so located as to pass through the portion 11 of the film.

The projecting apparatus comprises a casing, 12, from one side of which projects a bracket in the form of a plate, 14, having, as best illustrated in Fig. 6, a pair of rearwardly projecting posts, 15 and 16, adapted to enter the tubular posts in the magazine and serve properly to position the magazine relatively to the projector and at the same time support the magazine. Extending through the post 16 is a shaft, 17, having at its inner end a notched head, 18, adapted to engage with the web or fin, 9, of the winding sleeve and thus unwind the film from the roll and transfer it to the winding support when the shaft is operated as will hereinafter be described.

The projector casing is closed on the rear side by a door, 20, which is preferably hinged at the side opposite that at which the magazine is located and is provided on its free side edge with a spring finger, 21, which, as best shown in Fig. 9, engages with the rear side of the magazine supported in operative relation to the projector, and holds the magazine on the supporting posts. In the casing, adjacent to the side opposite that at which the magazine is located, is a lens-containing tube, 22, of any usual or suitable construction arranged with its axis parallel with the axes of the supporting posts in the magazine. The wall of the casing, adjacent to the opening or openings, 10, in the magazine, is provided with an opening, as indicated at 23, to permit the film to be carried into the casing; the film being arranged in the casing in the form of an inverted loop, as heretofore explained, the vertical portion, 11, of the loop being located behind the member 22. The lens device, arranged in the tubular support 22, is provided with a finger, 24, projecting upwardly from the same through an inclined slot, 25, in the tube and out of the top of the casing; the slot being inclined to the axis of the tube so that by swinging the finger to the right or to the left, the lens device is carried axially of the tube for focusing purposes.

Behind the rear end of the lens tube is a vertical holder and guide, 26, for the vertical portion of the film. The film is yieldably held in the holder and guide by a spring actuated gate, 27, which may be swung from the full line position shown in Fig. 3 to the dotted line position shown in this same figure. The holder and the gate are provided with registering openings, 28 and 29, respectively, at the optical axis of the lens device, for the purpose of permitting light from the lamp house, 30, to pass through the film and lens device.

At the side of the projector opposite that at which the magazine is located, is an actuating handle, 31, adapted to rotate a shaft, 32, extending into the projector and driving a shaft, 33, through suitable bevel gears, 34; the shaft 33 being parallel with the shaft 17 in the post 16. On the shaft 33 is a pulley, 35, and on the shaft 17 is a pulley, 36. A flexible, resilient belt, 37, passes over these pulleys and serves, when the handle 31 is rotated, to turn the winding support in the magazine and carry the film progressively through the projector. On the shaft 33, in the same plane as the magazine, is a drum-like sprocket wheel, 38, having two rows of sprocket teeth, 39, spaced apart a distance equal to the spacing between the holes, 40, in the film by means of which the film is driven. The portions of the film in the projector, adjacent to the magazine, pass over and under this sprocket wheel and are held in place by suitable rollers, 41, which may conveniently be mounted on swinging supports, 42, acted on by springs, 43, to press the rollers against the sprocket wheel. In placing the film in position or taking it out, the members 52 are swung apart to permit the film sections to be lifted on or off the teeth on the sprocket wheel.

It will be seen that when the operating handle is turned, the necessary slack for forming the loop will be produced by the sprocket wheel while the winding post driven by the shaft 17, will take up the film as fast as it is delivered by the lower half of the sprocket wheel, so that there will be no slack between the sprocket wheel and the magazine.

The feeding of the film heretofore described is continuous while the operating handle is being turned while that portion of the film through which the light from the lamp is passing must remain stationary for an appreciable length of time. In other words, the vertical portion of the loop of the film must be fed intermittently. To produce the intermittent feed of the film there is provided a shuttle device driven by a shaft, 50, which lies just below the lens tube 22 and is driven from the shaft, 33, by a suitable gear and pinion, 51 and 52, respectively. On the inner end of the shaft 50 is a cam, 53, which lies between flanges 54 and 55 on a vertically reciprocable plate, 56, associated with the film holder and guide 26. The cam is so arranged that when the shaft 50 rotates, the plate 56 is reciprocated in the vertical direction. Hung upon the lower end of the plate 56 is a double pawl, 57, each of the members of which preferably comprises two ratchet teeth, 58, arranged one above the other. A spring, 59, tends constantly to swing the pawl forward into a position where its teeth cross the plane of the vertical portion, 11, of the film loop. The two teeth of each pawl are spaced apart a distance equal to the distance between the holes in the film while the two sets of teeth are spaced apart a distance equal to that between the two rows of holes in the film. The result is that when the shaft 50 is rotated, the cam moves the plate 56 up, allowing the double pawl to trail. Then, when the plate begins to move down, the teeth of the double pawl enter the holes in the film and feed the film forward one step where it remains until the plate has been carried up again and begins its return movement. In this way a positive step by step movement of the film is obtained; the parts being so proportioned that slack is formed and taken out of the loop, by the constantly operating feeding devices, just fast enough to permit the loop in the film to retain its shape.

While the film is standing still the light is being projected through it and, while it is moving, it is necessary to shut off the light. In the arrangement shown, there is placed on the outer end of the shaft 50 a combined fly wheel and shutter, 60, which is large enough in diameter to overlie the opening, 61, in the front wall of the projector casing at the optical axis of the lens device. A portion of the wheel 60 is cut away to produce a shutter opening, 62. Whenever the shutter opening registers with the opening 61, light passes completely through the projector while other times light is shut off. The opening, 61, as appears from Fig. 5, is made elongated in the vertical direction and the lens holding member, 22, is carried on a vertically adjustable bracket, 63, whereby the lens device may be adjusted somewhat in the vertical direction in order properly to frame the picture or, in other words, in order to bring the center of each picture on the film at the optical axis of the lens device. The bracket may conveniently be adjusted by means of a screw, 64, threaded at its lower end in a portion of the bracket and extending at its upper end through the top of the casing of the projector where it is held against axial movement by a suitable bearing member, 13. By turning the screw in one direction or the other, the optical axis of the lens device may be raised or lowered.

The projector is conveniently mounted in operative relation to the lamp house by securing the base, 65, of the projector upon rods, 66, projecting forwardly from the lamp house. The proximity of the projector to the lamp house prevents the door of the projector from being opened and therefore, to give access to the interior of the projector and permit the film to be placed in position and removed, I hinge the casing of the projector to the base at the front lower corner as indicated at 67 and provide a suitable holding device, 68, at the rear lower corner by means of which the casing is ordinarily locked in its upright position. When it is desired to gain access to the interior of the casing, the holding device is released and the casing may then be swung back into a horizontal position as indicated in Fig. 4. A suitable chain or link, 69, may be placed between the base and the projector casing to prevent the casing from swinging past the horizontal position.

The door of the projector casing is of course provided with an opening, as indicated at 70, for the passage of light and, in order to shut off the light when the machine is not being operated, I have provided a suitable shutter for controlling this opening. In the arrangement shown, the shutter comprises an L-shaped member pivoted to the door, as indicated at 71, at the angle between a short horizontal arm, 72, and a long upright arm, 73, adapted normally to be held by gravity against a stop, 74, on the door, in position to close the opening 70. The arm 72 in the shutter overlies the rear end of a controlling lever, 75, loosely supported at its front end on the operating shaft 32 and having a downwardly projecting ear, 76, adapted to be engaged by an operating finger, 77, to cause the rear end of the lever to be swung up and swing the shutter away from the opening 70 in the door. The actuating means for the finger 77 is best shown in Figs. 7 and 10. Referring to these figures, 79 represents a bearing post for the shaft 32, supported by and projecting outwardly from the wall of the projector casing. Revolubly supported on the post is a sleeve, 80, to the inner end of which is attached the finger, 77, which may conveniently lie on the outside of the projector and have an inwardly extending portion, 78, passing through the wall of the projector in rear of the part 76 on the lever 75. The outer end of the sleeve is provided with a recess, 81, in the shape of a frustum of a cone, into which projects a complementary head, 82, on a sleeve, 83, mounted on the outer end of the shaft 32 and rigidly connected to the operating handle, 31. The sleeve, 83, is loose on the shaft 32 but is permitted only limited movements thereon by reason of a pin, 85, extending from the shaft through a diagonal slot, 86, in the sleeve. The outer end of the shaft is made hollow and contains a spring, 87, which engages with the handle, 31, and tends constantly to push the handle and the sleeve outwardly. The parts 81 and 82 constitute a friction clutch which, when the machine is standing idle, is open by reason of the fact that the spring 87 holds the part 82 out of engagement with the part 81. When the operator grasps the handle and turns it, the first operation is to cause the sleeve 83 to move inwardly along the shaft by reason of the wedging action of the pin and slot connection. This results in bringing the two members of the clutch together and causing the controlling lever for the shutter on the casing door to be actuated in the direction to open the shutter. Thereafter, the shutter is held open by reason of the tendency of the post 80 to turn, the clutch slipping and exerting a constant turning tendency on the post. As soon as the handle is released, the holding means for the shutter lever is discontinued and the lever and the shutter both swing by gravity into the positions necessary to cause the light through the door of the projector to be cut off.

While I have illustrated my invention and described it in detail solely as embodied in a projecting apparatus, it is evident that except as to detail, the apparatus for taking motion pictures and the method of handling the film in the taking of pictures is the same as the apparatus for projecting the pictures and the method of handling the film in the projecting apparatus. Thus, while in one case the film is a sensitized film and while in the other it is a developed film, the loop into which it is progressively formed will be the same in the camera as in the projecting apparatus. Similarly, the feeding devices for the film will operate equally well in the camera and in the projector. I therefore do not intend to be limited solely to the projecting end of the motion picture art but intend to cover as well the other end which has to do with the taking of the pictures. Furthermore, while I have illustrated and described with particularity only a single construction and style of apparatus, I do not desire to be limited except to the extent indicated by the terms employed in the appended claims which constitute the definitions of my invention.

I claim:

1. In a motion picture apparatus, a flat shallow box having two shallow posts projecting upwardly from the bottom thereof, said posts being tubular and registering with openings through the bottom of the box, one of the side walls of the box having an opening therethrough, a roll of film supported on one of said posts, a sleeve rotatable on the other post, the free end of the film being secured to said sleeve, and the film in passing from the roll to said sleeve extending outwardly through the opening in the side wall of the box.

2. In a motion picture apparatus, a casing having an optical device, a magazine detachably connected on the outside of the casing, two film supports in said magazine having their axes parallel with the axis of said optical device, and the film extending from the magazine into the casing past the optical device, and back into the magazine.

3. In a motion picture apparatus, a casing having a bracket extending from one side thereof, two separated posts on said bracket; a flat and shallow magazine containing two tubular film supports; said supports being spaced apart a distance equal to the distance between said posts and being adapted to fit over said posts.

4. In a motion picture apparatus, a casing having a bracket extending from one side thereof, two separated posts on said bracket; a flat and shallow magazine containing two tubular film supports; said supports being spaced apart a distance equal to the distance between said posts and being adapted to fit over said posts; and co-operating winding devices associated with one of said posts and the corresponding support.

5. In a motion picture apparatus, a casing having a bracket on one side thereof, separated posts extending rearwardly from said bracket, one of said posts having a rotatable part, a film magazine having hollow film supports opening out of the front side of the magazine and adapted to be slipped over said posts, and means associated with one of said supports adapted to interlock with said rotatable part to form a driving connection for the film.

6. In a motion picture apparatus, a casing having a bracket on one side, separated posts projecting rearwardly from said bracket, a magazine having openings to receive said posts, a door on the rear of the projector, and a part on the door adapted to engage with the rear of the magazine and hold it on said posts.

7. In a motion picture apparatus, a casing, two separated parallel posts supported by the casing, a flat shallow magazine containing two tubular film supports, said supports being spaced apart a distance equal to the distance between said posts and being adapted to fit over said posts, and co-operating winding devices associated with one of said posts and the corresponding support.

8. The method of manipulating a film in a motion picture apparatus which consists in unwinding the film from a roll and winding it upon another roll so located that the film tends to lie in a straight strip between the two rolls, pulling the portion of the strip of the film extending between the rolls into the form of a single loop, twisting the middle portion of the loop through an angle of 270 degrees so as to cause the loop to remain self-supporting in a reversed form, and then feeding the film while maintaining the reversed loop.

9. The method of manipulating a film in a motion picture apparatus which consists in unwinding the film from a roll and winding it upon another roll so located that the film tends to lie in a straight flat strip between the two rolls, pulling the portion of the strip of the film extending between the rolls into the form of a simple loop, twisting the loop so as to carry the central portion thereof through an angle of 270 degrees about an axis running longitudinally through said central portion, and leave the loop in a self-supporting condition in which the extreme central part and the adjacent sections of the film form a U-shaped member lying in a plane at right angles to the original plane of the loop, and then feeding the film while maintaining the reversed loop.

10. The method of manipulating a film in a motion picture apparatus which consists in placing a roll of film on a support in a container, connecting one end of the film to a support parallel with the aforesaid support, drawing a portion of the strip of the film extending between said supports out of the container into the form of a simple loop, twisting the film in the loop so as to produce a reversed self-supporting loop in which the central portion has been turned through an angle of 270 degrees about its longitudinal axis, and then feeding the film progressively from one support to the other while maintaining the reversed loop.

11. In a motion picture apparatus, an optical device, means for supporting the same, a holder for locating a section of film at one end of said device and in a plane at right angles to the axis of said device, a film-engaging feed wheel arranged at one side of said plane with its axis parallel to the aforesaid axis, a shutter, actuating mechanism for said shutter and the film, said actuating mechanism and the means for supporting said optical device being so constructed and arranged as to leave an unobstructed space between said wheel and said device and on three sides of the latter so as to permit the insertion in and removal from said holder of a preformed loop having its ends passing over said wheel and having its central portion deflected so as to produce a U-shaped part extending laterally at right angles to its ends.

12. In a motion picture apparatus, a casing, a film container having a slot in one side for the passage of a loop of film from rolls within the container, an optical device, a shutter mechanism, feed mechanism for the film, and means associated with the casing for detachably supporting said container; said optical device, said shutter mechanism, and said feeding mechanism being so constructed and arranged as to leave a free space permitting the positioning in operative relation to said optical device and the film feeding mechanism of a preformed loop of film drawn out of the container and having the middle portion thereof twisted through an angle of 270 degrees so as to cause the loop to remain self-supporting in a reversed form.

In testimony whereof, I sign this specification.

FRANK L. HOUGH.